(12) United States Patent
Murakami et al.

(10) Patent No.: US 7,091,266 B2
(45) Date of Patent: Aug. 15, 2006

(54) FLAME RETARDANT COMPOSITION

(75) Inventors: Fumiki Murakami, Sodegaura (JP); Junnichi Nakahashi, Kimitsu (JP); Atsushi Nanasawa, Sodegaura (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/515,377

(22) PCT Filed: May 27, 2003

(86) PCT No.: PCT/JP03/06581

§ 371 (c)(1), (2), (4) Date: Nov. 23, 2004

(87) PCT Pub. No.: WO03/099928

PCT Pub. Date: Dec. 4, 2003

(65) Prior Publication Data

US 2005/0228087 A1    Oct. 13, 2005

(30) Foreign Application Priority Data

May 28, 2002  (JP)  .............................. 2002-153639

(51) Int. Cl.
*C08K 5/5399* (2006.01)

(52) U.S. Cl. ........................ 524/116; 524/122; 524/138; 524/148

(58) Field of Classification Search ................ 524/116, 524/122, 138, 148
See application file for complete search history.

(56) References Cited

U.S. PATENT DOCUMENTS

2004/0265595 A1 * 12/2004 Tokiwa

FOREIGN PATENT DOCUMENTS

| | | |
|---|---|---|
| EP | 1160276 | 12/2001 |
| JP | 60-58461 | 4/1985 |
| JP | 9-71708 | 3/1997 |
| JP | 2001-49090 | 2/2001 |
| JP | 2001-342357 | 12/2001 |
| JP | 2002-53751 | 2/2002 |
| JP | 2002-105334 | 4/2002 |
| JP | 2002-129033 | 5/2002 |
| WO | WO02/20664 A1 | 3/2002 |

* cited by examiner

*Primary Examiner*—Peter Szekely
(74) *Attorney, Agent, or Firm*—Staas & Halsey LLP

(57) ABSTRACT

A flame-retardant composition comprises a polyphenylene ether resin having a number average molecular weight in terms of polystyrene of 500 to 5,000 and a phosphazene compound, the content of the polyphenylene ether being 20 to 95% by weight and that of the phosphazene compound being 80 to 5% by weight. The flame-retardant composition is excellent in processability when added to resins, and can provide a resin composition that contains no halogens and has an excellent balance of processability, heat resistance and flame retardancy.

16 Claims, No Drawings

FLAME RETARDANT COMPOSITION

CROSS REFERENCE TO RELATED APPLICATIONS

This application is based on and hereby claims priority to Japanese Application No. 2002-153639 filed on May 28, 2002 and PCT Application No. PCT/JP03/06581 filed on May 27, 2003, the contents of which are hereby incorporated by reference.

BACKGROUND OF THE INVENTION

The present invention relates to a flame-retardant composition, and more particularly to a flame-retardant composition having excellent processability, which provides a resin composition having good heat resistance and appearance of molded articles when mixed with a resin or the like.

In order to make flammable resins flame retardant, halogen compounds, antimony trioxide and the like have been incorporated therein. However, it has been pointed out that these flame-retardation methods are not desirable in terms of environmental protection, toxicity and the like, and there is a demand to improve the flame-retardation methods. Phosphorus-based flame-retardants have been studied as a substitute for halogen-containing and metal oxide flame retardants. A proposed mechanism of the flame-retardation suggests that a polyphosphoric acid phase formed on the surface of the resin and a carbonized phase resulting from the dehydration of the resin during combustion. It is believed that the polyphosphoric acid phase and/or the carbonized phase acts as films to cut off heat and oxygen to the resin. Consequently, for resins that are difficult to form a carbonized film by dehydration, the flame-retardation must rely on the film of the polyphosphoric acid phase. Thus, without a substantial carbonized film, more polyphosphoric acid must be added to the resin. When compounds with a high phosphorus atom concentration are used, a high flame-retardation effect can be expected by adding them in a small amount. Red phosphorus, phosphoric acid esters, condensed phosphoric acid esters and the like have conventionally been used as phosphorus-based flame-retardants. Red phosphorus has had problems such as mold corrosion because corrosive phosphoric acid is produced by hydrolysis. A large amount of phosphorous addition has been required for phosphoric acid esters and condensed phosphoric acid esters as they have a relatively low concentration of phosphorus. This has deteriorated mechanical properties, thermal properties and the like, and caused problems such as cost increases due because of the amount of phosphorous.

On the other hand, phosphazene compounds such as aryloxy phosphazenes, alkoxy phosphazenes, thiophosphazenes, halogenated phosphazenes and phosphazene polymers derived from these compounds have been studied for use as flame-retardants, lubricant, incombustible electrolytic solutions and carcinostatic agents. Particularly in recent years, phosphazene compounds have attracted attention because they have a high phosphorus content, as well as high heat resistance, hydrolysis resistance and flame retardancy. Several methods have proposed imparting flame-retardation to resins using phosphazene compounds.

For example, JP-B-3-73590 proposes a flame-retardant resin composition including a polyphenylene ether with the customary molecular weight, polystyrene and a phosphazene compound; JP-A-8-302124 proposes a flame-retardant resin composition formed of a styrenic resin-containing thermoplastic resin composition, a phosphazene compound and a polyphenol compound; and JP-A-8-225714 discloses a thermosetting resin composition which includes a phosphazene compound. Although flame retardant properties were good, the resin compositions were not acceptable in terms of processability and appearance of molded articles produced therefrom.

Moreover, WO 03/002666 proposes a method in which a crosslinked phosphazene compound and a polyphenylene ether resin with customary molecular weight are used as a flame-retardant in a polyalkylene arylate resin. This imparted good flame retardancy to the polyalkylene arylate resin, but the resulting resin was not acceptable in terms of processability and appearance of molded articles produce therefrom.

JP-A-2001-49090 discloses a resin composition formed of a thermoplastic or thermosetting resin with a weight average molecular weight of 10,000 or more, an epoxy resin and a phosphazene compound. The resin composition uses a high-molecular weight thermoplastic or thermosetting resin, and was not acceptable in terms of processability and appearance of molded articles thereof.

SUMMARY OF THE INVENTION

It is an object of the present invention to provide a flame-retardant composition having excellent processability, which provides a resin composition having good heat resistance and appearance of molded articles when mixed with a resin or the like.

As a result of diligent investigations for solving the above problems, the present inventors discovered that the use of a flame-retardant composition comprising a combination of a polyphenylene ether resin having a specific molecular weight and a phosphazene compound can impart stable flame retardancy even to resins that are difficult to form a carbonized film and can provide a flame-retardant resin composition having good heat resistance which composition produces molded articles having a good appearance.

That is, the present invention relates to:

1. a flame-retardant composition comprising from 20 to 95% by weight of (a) a polyphenylene ether resin having a number average molecular weight of 500 to 5,000, and from 80 to 5% by weight of (b) a phosphazene compound;

2. the flame-retardant composition according to the above 1, wherein said polyphenylene ether resin has a number average molecular weight of 1,200 to 4,000;

3. the flame-retardant resin composition according to the above 1 or 2, wherein a part or all of said polyphenylene ether resin is functionalized with a compound having at least one functional group selected from the group consisting of an epoxy group, an amino group, a hydroxy group, a mercapto group, a carboxyl group and a silyl group;

4. the flame-retardant composition according to any of the above 1 to 3, wherein said phosphazene compound comprises a total of 95% by weight or more of a cyclic phosphazene compound represented by formula (1) and/or a straight chain phosphazene compound represented by formula (2):

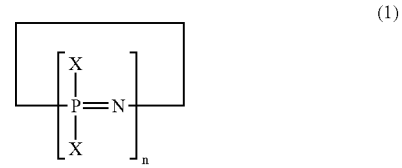

(1)

-continued

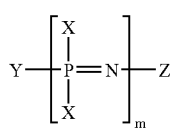
(2)

wherein n represents an integer of 3 to 15; m represents an integer of 3 to 1,000; X represents an aryloxy group represented by formula (3):

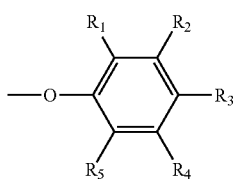
(3)

(wherein R1, R2, R3, R4 and R5 each independently represent hydrogen atom, an alkyl or alkoxy group having 1–5 carbon atoms or a phenyl group), a naphthyloxy group, or an alkyloxy group having 1–6 carbon atoms; Y represents —N=P(O)(X) or —N=P(X)$_3$; and Z represents —P(X)$_4$ or —P(O)(X)$_2$;

5. the flame-retardant composition according to the above 4, wherein said phosphazene compound comprises 95% by weight or more of a cyclic phosphazene compound;

6. the flame-retardant composition according to the above 4 or 5, wherein 90 mol % or more of the all occurrences of substituent X is a phenoxy group in said phosphazene compound;

7. the flame-retardant composition according to any of the above 1 to 6, wherein said phosphazene compound comprises 80% by weight or more of a cyclic phosphazene trimer and/or tetramer;

8. the flame-retardant composition according to any of the above 1 to 7, wherein said polyphenylene ether resin has an average particle diameter of 5 μm to 500 μm;

9. a flame-retardant resin composition comprising a resin and the flame-retardant composition according to any of the above 1 to 8;

10. the flame-retardant resin composition according to the above 9, wherein said resin is at least one thermosetting resin selected from the group consisting of unsaturated polyester resins, vinylester resins, diallylphthalate resins, epoxy resins, cyanate resins, xylene resins, triazine resins, phenol resins, urea resins, melamine resins, benzoguanamine resins, urethane resins, ketone resins, alkyd resins, furan resins, styryl pyridine resins, silicone resins and synthetic rubbers;

11. the flame-retardant resin composition according to the above 9, wherein said resin comprises an epoxy resin;

12. the flame-retardant resin composition according to any of the above 9 to 11, wherein the concentration of phosphorus atoms is from 0.5% to 8.0% by weight;

13. the flame-retardant resin composition according to any of the above 9 to 12, wherein the polyphenylene ether resin is dispersed as particles with an average diameter of 10 μm or less;

14. the flame-retardant resin composition according to the above 9, characterized in that said resin is a thermoplastic resin;

15. the flame-retardant resin composition according to the above 9, wherein said resin is at least one thermoplastic resin selected from the group consisting of polycarbonates, polyphenylene ethers, polyphenylene sulfides, polypropylene, polyethylene, polystyrene, ABS resins, polyalkylene terephthalates, polyamides, thermotropic liquid crystal polymers and elastomer-containing polystyrenes;

16. the flame-retardant resin composition according to the above 9, wherein said resin is at least one thermoplastic resin selected from the group consisting of polyphenylene ether/polypropylene, polyphenylene ether/polystyrene, polyphenylene ether/polyamide, polyphenylene ether/thermotropic liquid crystal polymer, polyphenylene ether/polyphenylene sulfide and polyphenylene ether/polyalkylene terephthalate;

17. the flame-retardant . . . (5) resin composition according to any of the above 9 to 16, wherein the sum of the content of component (a) and a double amount of the content of component (b) in the flame-retardant resin composition is 15% by weight or more;

18. the flame-retardant resin composition according to any of the above 9 to 16, wherein the sum of the content of component (a) and a double amount of the content of component (b) in the flame-retardant resin composition is 25% by weight or more;

19. the flame-retardant resin composition according to any of the above 9 to 16, wherein the sum of the content of component (a) and a double amount of the content of component (b) in the flame-retardant resin composition is 40% by weight or more; and 20. the flame-retardant resin composition according to any of the above 9 to 19, which is used for electronic equipment, parts or housings usable in a high-frequency range of 1 gigahertz (GHz) or more.

DETAILED DESCRIPTION OF THE PREFERRED EMBODIMENT

Reference will now be made in detail to the preferred embodiments of the present invention, examples of which are described below.

As the polyphenylene ether resins (a), there can be used a homopolymer or a copolymer having repeating units represented by general formulas (4) and/or (5):

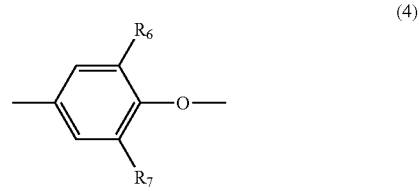
(4)

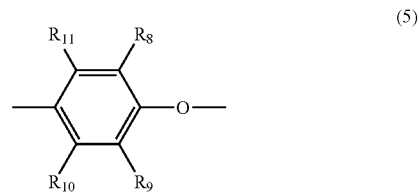
(5)

(where R6, R7, R8, R9, R10 and R11 each independently represent an alkyl group of 1–4 carbon atoms, an aryl group, halogen or hydrogen, with a proviso that R10 and R11 do not simultaneously represent hydrogen).

Polyphenylene ether resins used as polymeric materials typically have a number average molecular weight of about 15,000 to 30,000. This is because polyphenylene ether resins with a number average molecular weight of about 5,000 have a low glass transition temperature, and therefore heat resistance imparting effect is reduced. Also, with a low molecular weight, entanglements of molecular chains fail to form, leading to a reduction in mechanical strength. The flame retardant composition has remarkably improved the processability of flame-retardant resin compositions by positively using such low-molecular weight polyphenylene ethers. Lower molecular weights provide higher molding processability. However, excessively low molecular weights are not preferred because the flame retarding effect cannot be sufficiently attained and heat resistance and mechanical strength are excessively reduced. On the other hand, a number average molecular weight greater than 5,000 is not preferred in that the resulting compositions will have reduced flowability and excessively reduced solubility to solvents and cause problems in processability though flame retardancy and heat resistance can be obtained. In order to obtain a flame-retardant composition having flame retardancy, good processability, and high heat resistance, the polyphenylene ether resin should have a number average molecular weight of from 500 to 5,000, preferably from 1,200 to 4,000, more preferably from 1,500 to 4,000.

Representative examples of homopolymers of the polyphenylene ether resins are poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-hydroxyethyl-1,4-phenylene)ether and the like.

Of these homopolymers, poly(2,6-dimethyl-1,4-phenylene)ether is preferred. Especially preferred are polyphenylene ethers having as a partial structure a 2-(dialkylaminomethyl)-6-methylphenylene ether unit, a 2-(N-alkyl-N-phenylaminomethyl)-6-methylphenylene ether unit or the like as disclosed in JP-A-63-301222.

Polyphenylene ether copolymers as used here are copolymers having a phenylene ether structure as a main monomer unit. Examples of such copolymers are copolymers of 2,6-dimethylphenol and 2,3,6-trimethylphenol, copolymers of 2,6-dimethylphenol and o-cresol, copolymers of 2,6-dimethylphenol, 2,3,6-trimethylphenol and o-cresol, etc.

The method for producing low-molecular weight polyphenylene ethers having a number average molecular weight of about 500 to 5,000, which can be used for the flame retardant composition, is not particularly restricted. The low-molecular weight polyphenylene ethers can be synthesized by, for example, a method in which oxidative polymerization of 2,6-dimethylphenol in toluene is interrupted in an early stage of the polymerization and a large amount of poor solvent is used to recover polymers, or a method in which 2,6-dimethylphenol is subjected to oxidative polymerization in a poor solvent to spontaneously precipitate a polyphenylene ether in which the degree of polymerization is still low.

A part or all of the polyphenylene ether resins can be modified polyphenylene ether resins functionalized with an epoxy group, an amino group, a hydroxy group, a mercapto group, a carboxyl group, a silyl group or the like. These may be used each alone or in combination. Moreover, the modified polyphenylene ethers may be obtained by functionalizing polyphenylene ethers having a number average molecular weight in terms of polystyrene of 500 to 5,000, and the number average molecular weight may exceed 5,000 by the functionalization.

The method for producing modified polyphenylene ether resins that are functionalized is not particularly limited as long as the frame retardant effect can be obtained. Modified polyphenylene ether resins that are functionalized with a carboxyl group are produced, for example, by melt kneading a polyphenylene ether resin with an unsaturated carboxylic acid or a functional derivative thereof to react in the presence or absence of a radical initiator. Alternatively, the modified resins may be produced by dissolving a polyphenylene ether and an unsaturated carboxylic acid or a functional derivative thereof in an organic solvent in the presence or absence of a radical initiator and reacting them in a solution.

Examples of the unsaturated carboxylic acids or functional derivatives thereof include maleic acid, fumaric acid, itaconic acid, halogenated maleic acid, cis-4-cyclohexene-1,2-dicarboxylic acid, endo-cis-bicyclo(2,2,1)-5-heptene-2,3-dicarboxylic acid, and anhydrides, esters, amides, imides, etc. of these dicarboxylic acids, and, furthermore, acrylic acid, methacrylic acid and esters, amides, etc. of these monocarboxylic acids. Moreover, saturated carboxylic acids may also be used, which carboxylic acids decompos at the reaction temperatures used to produce the modified polyphenylene ether. When decomposed, the saturated carboxylic acids become the functional derivatives usable for the flame retardant composition. Examples of such acids are malic acid, citric acid, etc. These may be used each alone or in combination.

The modified polyphenylene ether resins that are functionalized can be produced according to a method described in, for example, JP-A-63-503392, JP-B-7-5818, JP-B-3-6185, JP-A-2001-302738, JP-A-2001-302789, JP-3289715, JP-3109735, JP Application 2001-388196 (JP-A-2003-183385), JP Application 2001-340239 (JP-A-2003-138010), JP-3403179, JP-3409035 or the like.

Moreover, the polyphenylene ether resins preferably have an average particle diameter thereof from 5 μm to 500 μm, more preferably from 10 μm to 400 μm, most preferably from 10 μm to 300 μm. An average particle diameter of less than 5 μm is not preferred because of a danger of a dust explosion; and an average particle diameter exceeding 500 μm is not preferred because of poor solubility in solvents. Examples of the methods for producing the polyphenylene ether resins include, but are not limited to, that of JP Application 2002-266710 (JP-A-2004-99824).

Known compounds can be used as the phosphazene compounds (b) for the flame retardant composition. These are disclosed, for example, in James E. Mark, Harry R. Allcock, Robert West, "Inorganic Polymers", Pretice-Hall International, Inc., 1992, p. 61-p. 140. Synthesis of these phosphazene compounds is described in JP-B-3-73590, JP-A-9-71708, JP-A-9-183864 and the like.

Among them, cyclic phosphazene compounds represented by formula (1) or straight chain phosphazene compounds represented by formula (2) are preferred:

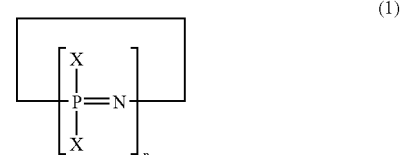

(1)

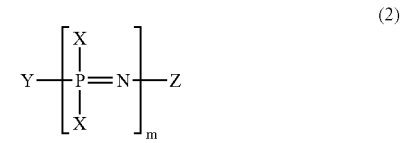

(2)

wherein n represents an integer of 3 to 15; m represents an integer of 3 to 1,000; X represents a naphthyloxy group, an alkyloxy group of 1–6 carbon atoms, or an aryloxy group represented by formula (3):

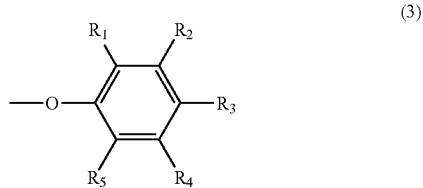

(wherein R1, R2, R3, R4 and R5 each independently represent hydrogen atom, an alkyl group of 1–5 carbon atoms, an alkoxy group of 1–5 carbon atoms or a phenyl group).; Y represents —N=P(O)(X) or —N=P(X)$_3$; and Z represents —P(X)$_4$ or —P(O)(X)$_2$]. It is preferred that 95% by weight or more of the phosphazene compounds have structure(s) identified above.

A single phosphazene compound or a mixture of two or more phosphazene compounds may be used. In particular, it is preferred that 95% by weight or more of the phosphazene compounds are cyclic phosphazene compounds because the concentration of phosphorus can be increased.

The substituent X is not restricted as long as the flame retardant effect can be achieved. Examples of the substituent X may include alkoxy groups such as methoxy, ethoxy, n-propyloxy, isopropyloxy, n-butyloxy, tert-butyloxy, s-butyloxy, n-amyloxy, isoamyloxy and n-hexyloxy; alkoxy-substituted alkoxy groups such as methoxyethoxy and methoxypropyloxy; a phenoxy group; alkyl-substituted phenoxy groups such as 2-methylphenoxy, 3-methylphenoxy, 4-methylphenoxy, 2,6-dimethylphenoxy, 2,5-dimethylphenoxy, 2,4-dimethylphenoxy, 3,5-dimethylphenoxy, 3,4-dimethylphenoxy, 4-tert-buthylphenoxy and 2-methyl-4-tert-butylphenoxy; and a naphtyloxy group. Of the substitutents X in the phosphazene compound, 90% by mol or more of all X substituents may be a phenoxy group, in terms of heat resistance and flame retardancy.

The phosphazene compound may be a mixture of a cyclic phosphazene and a straight chain phosphazene. The mixture preferably has a high content of a cyclic phosphazene trimer and/or phosphazene tetramer to achieve processability of the resulting flame-retardant resin compositions. Specifically, the phosphazene compound preferably comprises 80% by weight or more of a cyclic phosphazene trimer and/or tetramer.

Furthermore, the phosphazene compounds may be crosslinked with a phenylene group, biphenylene group or a group represented by formula (6):

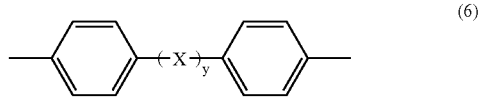

(wherein X represents C(CH$_3$)$_2$, SO$_2$, S or O; and y represents 0 or 1). Cross linking may be preformed by the method disclosed in WO 00/09518. These phosphazene compounds having a crosslinked structure are produced specifically by reacting a dichlorophosphazene oligomer with an alkali metal salt of phenol and an alkali metal salt of an aromatic dihydroxy compound. These alkali metal salts are added to the dichlorophosphazene oligomer in slight excess of the stoichiometric amount. These phosphazene compounds may be used each alone or as a mixture of two or more.

The amounts of the low molecular weight polyphenylene ether resin (a) and the phosphazene compound (b) are 20–95% by weight of polyphenylene ether and 80–5% by weight of a phosphazene compound, preferably 20–85% by weight of polyphenylene ether and 80–15% by weight of a phosphazene compound. A larger amount of the polyphenylene resin is not preferred as it reduces processability, and on the other hand a smaller amount thereof is not preferred as it tends to reduce flame retardancy.

Further, the flame retardant composition may use conventionally known non-halogen and non-antimony flame-retardants in combination in an amount that achieves the flame retardant effect. Examples of these flame-retardants may include phosphoric acid esters such as triphenyl phosphate, tricresyl phosphate, trixylenyl phosphate, cresyl diphenyl phosphate, xylenyl diphenyl phosphate, dixylenyl phenyl phosphate, hydroxynone bisphenol, resorcinol bisphosphate and bisphenol-A bisphosphate; metal hydroxides such as magnesium hydroxide, aluminum hydroxide and calcium aluminate; nitrogen-containing compounds such as triazine compounds, melamines, melamine cyanurates, melamine resins and guanidine compounds; and silicon-containing compounds.

The form of the flame-retardant composition is not particularly limited as long as the flame retardant effect can be achieved. The flame-retardant composition is supplied, for example, as a powder, tablets, pellets, blocks, a wax, a liquid, an oil, etc. Further, if necessary, a vaporized flame-retardant composition may be used too. Furthermore, in the flame-retardant composition, the polyphenylene ether resin and phosphazene compound may be completely dissolvedin one another, or these two components may be simply mixed. In addition, the flame-retardant composition may be a mixture of two sources, one with dissolved componentsand t one with mixed components.

Methods for producing the flame-retardant composition are not particularly limited as long as the method provides the flame retardant effect. The polyphenylene ether and phosphazene compound may be melt-blended to obtain the composition, wherein extruders or the like may be used. There may be used a method in which both components or only one component is dissolved in an organic solvent or the like and the two components are mixed; and the composition may be obtained by removing the solvent from the mixture.

The flame-retardant composition is most suitably used for flame-retardant resins, paints, coating agents, lithium ion batteries, rubbers, lubricants, nonflammable electrolytic solutions and the like.

The flame-retardant composition can be used in combination with conventionally known resins. The resins are not particularly limited and known thermosetting resins and thermoplastic resins can be suitably used. Examples of thermoplastic resins may include polycarbonates, polyphenylene ethers, polyphenylene sulfides, polypropylene, polyethylene, polystyrene, high-impact polystyrenes, elastomer-containing polystyrenes, syndiotactic polystyrene, ABS resins, polycarbonate-ABS resin alloys, polyalkylene terephthalates such as polybutylene terephthalate, polyethylene terephthalate and polypropylene terephthalate, polyamides, thermotropic liquid crystal resins and the like. Particularly, suitably are polyphenylene ethers, polystyrene, alloys of polyphenylene ether and polystyrene, alloys of polyphenylene ether and polyamide, alloys of polyphenylene ether and thermotropic liquid crystal resin, and alloys of polyphenylene ether and polyphenylene sulfide.

Suitable thermosetting resins include unsaturated polyester resins, vinylester resins, diallylphthalate resins, epoxy resins, cyanate resins, xylene resins, triazine resins, phenol resins, urea resins, melamine resins, benzoguanamine resins, urethane resins, ketone resins, alkyd resins, furan resins, styryl pyridine resins, silicone resins and synthetic rubbers; and epoxy resins.

The resins used may be used each alone or in combination of two or more.

Epoxy resins suitably used for the flame retardant composition may include, but are not limited to, compounds which have at least two epoxy groups in a molecule. Examples of epoxy resins may include bisphenol-A epoxy resins, bisphenol-F epoxy resins, bisphenol-S epoxy resins, resorcinol epoxy resins, novolak epoxy resins, biphenyl epoxy resins, multifunctional epoxy resins and the like; and these epoxy resins may be used each alone or in combination.

Moreover, when the flame-retardant composition is added to thermosetting resins, the resins preferably form a continuous layeron the article, in which the polyphenylene ether (a) is dispersed. In this case, the polyphenylene ether has an average dispersed-particle diameter of 10 μm or less, preferably 5 μm or less. A dispersed-particle diameter of larger than 10 μm is not preferred because the composition will have a reduced flame retardancy, reduced mechanical properties such as drill resistance, reduced stability of electrical characteristics, poor appearance of the composition and the like. Alternatively, the polyphenylene ether and thermosetting resins may be completely dissolved with each other.

How to achieve the dispersed-particle diameter is not particularly limited.

The average diameter of the polyphenylene ether resin to form a disperse phase is determined in a manner as described below. A molded article of the composition is fractured at ordinary temperatures to low temperatures, and a revealed surface is observed with a scanning electron microscope and is photographed. The equivalent diameter of dispersed particles of the polyphenylene ether resin (the diameter of a circle which occupies the same area as that occupied by a dispersed particle) is then determined, and the average particle diameter is calculated according to the following equation:

$$\text{Average particle diameter} = \frac{\sum (Di)^4 \cdot Ni}{\sum (Di)^3 \cdot Ni}$$

wherein

Di: circle-equivalent diameter of dispersed particles (μm)

Ni: number of dispersed particles whose circle-equivalent diameter is Di (piece)

When the flame-retardant composition is combined with a resin to form a flame-retardant resin composition, the ratio of both components cannot be determined with certainty because flame retardancy is different for each resin to be used. Preferably, the concentration of phosphorus in the flame-retardant resin composition is 0.5% by weight or more for modified polyphenylene ethers and polycarbonate-ABS alloys to which flame retardancy can easily be imparted, and 1% by weight or more for polystyrene, polybutadiene, styryl-copolymerized elastomers, ABS resins, epoxy resins, phenol resins and the like which are combustible. The concentration of phosphorus of 8% by weight or more for imparting flame retardancy would be impractical because of an excessively large ratio of the flame-retardant composition in the resin composition, and is not preferred because the flame-retardant may ooze out to the surface of the resin. Methods for mixing the flame-retardant composition and the resin may include a method in which a flame-retardant composition is first prepared and then it is mixed with a resin by an extruder or a kneader; a method in which a liquid flame-retardant composition is mixed with a resin solution or a curable-resin precursor solution; a method in which a low molecular weight polyphenylene ether and a phosphazene compound are subjected to one melting and mixing operation using an extruder to produce a flame-retardant composition; and the like.

As for the ratio of mixing component (a), component (b) and a resin, the sum of the content of component (a) and a double amount of the content of component (b) is 15% by weight or more, preferably 20% by weight or more, more preferably 40% by weight or more. The sum of the content of component (a) and a double amount of the content of component (b) of less than 15% by weight is not preferred because adequate flame retardancy may not be obtained when the flame-retardant composition is added to a resin.

Additives may be used for the flame-retardant resin in amounts that do not detract from the flame retardant effect. For example, when it is necessary to improve the rigidity or dimensional stability of the resin composition, inorganic fillers may be added in an amount such that the flame retardant effect is not impaired. The typically used fillers, whose type can be arbitrarily selected depending on objects, include glass fibers, potassium titanate fibers, glass cloths, glass flakes, carbon fibers, mica, talc, silica, zircon, alumina, graphite, fulleren, gypsum, quartz, magnesite, kaolin, silicon carbide, calcium carbonate, iron powder, copper powder and the like.

In order to further impart other characteristics to the resin composition, plasticizers, stabilizers such as antioxidants and ultraviolet absorbers, antistatic agents, stress relaxing agents, releasing agents, flow control agents, dye, sensitizers, coloring pigments, surface treatment agents, rubber polymers and the like can be added. In addition, it is possible to further improve flame retardancy by adding known flame-retardants and flame-retardant auxiliaries such as, for example, alkali metal hydroxides or alkaline earth metal hydroxides such as magnesium hydroxide and aluminum hydroxide which contain water of crystallization, zinc borate compounds, lead stannate compounds, and inorganic silicon compounds such as silica, kaolin clay and talc.

The methods for mixing these additives are not particularly limited as long as they do not impair the flame retardant effect, and may include, for example, mixing additives into a flame-retardant composition in advance, or mixing additives into a resin in advance. Moreover, the flame-retardant composition, resin and additives may be simultaneously mixed or may be successively mixed.

When the flame-retardant composition is used for a crosslinkable resin, a hardner may be used for the purpose of reducing the hardening temperature or promoting the hardening reaction. The hardners to be used may include, but are not limited to, conventionally known hardners for crosslinkable resins. Examples of hardners include amines such as diethylenetriamine, triethylenetetramine, tetraethylenepentamine, pentaethylenehexamine, diethylaminopropylamine, 3,9-bis(3-aminopropyl)-2,4,8,10-tetraoxaspiro undecane, menthendiamine, isophoronediamine, N-aminoethyl piperadine, m-xylylenediamine (m-xylene-α,α'-diamine), m-phenylenediamine, diaminodiphenylmethane, diaminodiphenylsulfone, dicyandiamide and adipic acid dihydrazide; phenol resins such as phenol novolac resins and cresol novolac resins; polymercaptanes such as liquid polymercaptanes and polysulfides; acid anhydrides such as maleic anhydride, phthalic anhydride, tetrahydrophthalic anhydride, hexahydrophthalic anhydride, methyltetrahydrophthalic anhydride, methylhexahydrophthalic anhydride, methyl nadic anhydride, pyromellitic anhydride, methylcyclohexene tetracarboxylic anhydride, dodecylsuccinic anhydride, trimellitic anhydride, chlorendic anhydride, benzophenonetetracarboxylic anhydride and ethyleneglycol bis (anhydrotrimellitate); tertiary amines such as triethylamine, tributylamine, benzyldimethylamine, 2-(dimethylaminomethyl)phenol and 2,4,6-tris(diaminomethyl)phenol; imidazoles such as 2-methylimidazole, 2-ethylimidazole, 2-ethyl-4-methylimidazole, 2-phenylimidazole, 2-undecylimidazole, 2-heptadecylimidazole and 2-phenyl-4-methylimidazole; organic phosphines such as triphenylphosphine and tributylphosphine; borates such as triphenylphosphine tetraphenylborate, tetraphenylphosphonium tetraphenylborate and triethylamine tetraphenylborate; quinoide compounds such as 1,4-benzoquinone, 1,4-naphthoquinone, 2,3-dimethyl-1,4-benzoquinone, 2,6-dimethylbenzoquinone and 2,3-dimethoxy-1,4-benzoquinone; cationic polymerization-type hardners such as a boron trifluoride-ethylamine complex; latent hardners; and the like. These hardners can be used each alone or in combination. Moreover, the added amount of these hardners is not limited, but is desirably in such a range as to leave a limited amount of unreacted components.

The method of mixing the flame-retardant composition and the resin is not limited as long as it can achieve the flame retardant effect. The low molecular weight polyphenylene ether resin and the phosphazene compound, as the components of the flame-retardant composition, may be mixed with each other in advance and then mixed with a resin, or the low molecular weight polyphenylene ether resin, phosphazene compound and a resin may be mixed together. Further, the low molecular weight polyphenylene ether and a resin are mixed in advance and then the phosphazene compound may be mixed with the mixture, or the phosphazene compound and a resin may be mixed in advance and then the low molecular weight polyphenylene ether resin may be mixed with the mixture. Thus, the order and method of mixing the low molecular weight polyphenylene ether resin and phosphazene compound, which are the components of the flame-retardant composition, and a resin are not particularly limited as long as they can achieve the flame retardant effect.

The composition can be produced by kneading the flame-retardant composition and a resin with kneading machines such as extruders, heating rolls, kneaders and Banbury mixers. When the flame-retardant composition is mixed with a thermoplastic resin, kneading by extruders is preferred in terms of productivity. The kneading temperature may depend on the preferred processing temperature of the base resin, and it ranges from 200° C. to 360° C. as a guide, and preferably ranges from 240° C. to 320° C.

In the case of a thermosetting resin, a method as described below may be used. That is, the components for producing a resin composition are mixed with a thermosetting resin, without a solvent or, if necessary, using a solvent which allows the components and the thermosetting resin to be uniformly mixed. Then, the solvent is removed from the mixture to obtain the resin composition, which is then cast into a mold and cured. The cured resin composition is cooled and removed from the mold to obtain a molded article. Alternatively, the resin composition may be cast into a mold and cured by hot press. The solvent to dissolve the respective components is not particularly limited as long as it can uniformly mix the various materials and the use thereof does not impair the flame retardant effect. Examples of the solvent include toluene, xylene, acetone, methyl ethyl ketone, diethyl ketone, cyclopentanone, cyclohexanone, dimethylformamide, methyl cellosolve, methanol, ethanol, n-propanol, iso-propanol, n-butanol, n-pentanol, n-hexanol, cyclohexanol, n-hexane, n-pentane and the like.

Another example of the composition may be produced by kneading the flame-retardant composition and a resin with kneading machines such as heating rolls, kneaders, Banbury mixers and extruders, and then the kneaded composition is cooled, pulverized, and molded by transfer molding, injection molding, compression molding or the like. Moreover, the hardening method varies depending on the hardners to be used, and is not particularly limited. For example, the hardening method may include thermal hardening, photohardening, hardening by pressure, hardening by moisture and the like, and is not limited as long as the hardening method can achieve the flame retardant effect. The order of mixing the components is not particularly limited as long as it can achieve the flame retardant effect. A method suitable for the resin may be used for the flame retardant composition.

The flame-retardant resin composition using the flame-retardant composition may be used optimally for electrical and electronic parts such as coil bobbins, flyback transformers, connectors and deflecting yokes, electrical and electronic material applications such as printed wiring boards, printed boards, sealing agents, electrical insulating materials, electrical coating agents, laminates, varnishes high-speed operation, advanced composites, wires, antenna materials, cables and high-performance molding compounds, coatings, adhesives, coating materials, tablewares, buttons, fiber and paper-treating agents, decorative laminates, UV-curable ink, sealants, synthetic leather, heat insulating and cushioning materials, materials for waterproofing coating film, anticorrosive lining, binders for molds, lacquer, paint, ink modifiers, resin modifiers, aircraft interior materials, matrixes for composites, housewares, OA equipment, AV equipment, battery applications, lighting equipment, automobile parts applications, housing applications, ETC, ITC, cellular phone applications and the like.

EXAMPLES

The flame retardant composition will be explained in detail by the following examples, but the present invention shall not be limited to these examples. Moreover, the method of preparing the composition is not particularly limited as long as various materials can be uniformly mixed by the method. In addition, % represents % by weight unless otherwise specified.

1) Determination of Number Average Molecular Weight

The number average molecular weight was determined using the gel permeation chromatography system "SHODEX GPC System 21" manufactured by Showa Denko K. K., a column in which K-800D-K805L-K805L are connected in series, and a UV detector, and flowing a chloroform solution of 1.0 ml/min at 40° C. A calibration curve was prepared by using standard polystyrenes having molecular weights of 550, 1,300, 2,960, 9,680, 28,600, 65,900 and 172,000. The detected wavelength for preparing the calibration curve was 254 nm, and the wavelength for determining polyphenylene ether was 283 nm.

2) Flame Retardancy

The test was performed according to UL-94 vertical flammability test, using a molded test piece of 128 mm in length×12.8 mm in width×1.6 mm in thickness, and the test piece was rated as belonging to one of the four classes, that is, V0, V1, V2 and substandard on the basis of total burning time when the test piece was allowed to contact a flame 10 times and on whether cotton was ignited by the burning droppings.

3) Observation of Fracture Surface

A scanning electron microscope (JSM-6700F manufactured by JEOL, Ltd. hereinafter referred to SEM) was used to measure the fracture surface of a sample at a magnification of 10,000 times. The sample was prepared by coating platinum or carbon on the fracture surface of a cured article of the resin composition.

4) Drill Resistance

A molded test piece of 50 mm in length×50 mm in width×2 mm in thickness was prepared. A hole was created at a central part of the molded test piece with an electric drill having a bit of 1 mm in diameter. Visual observations were made to determine whether any chipping occurred at the hole.

5) Electrical Characteristics

A molded test piece of about 2 mm in thickness was used to measure a dielectric constant and a dielectric loss tangent at a frequency of 1 GHz.

6) Average Diameter of Dispersed Particles of Polyphenylene Ether Resin

A molded test piece was fractured at room temperature, and the cross section was magnified by 10,000 times by a scanning electron microscope for observation and photographing. An average value of circle-equivalent diameters of dispersed particles was determined according to the equation described in the specification.

7) Determination of Polyphenylene Ether Particle Diameter

The polyphenylene ether obtained from each example was sifted through a sieve with an aperture of 1,000 tm, and the weight of the sifted polyphenylene ether was measured. The polyphenylene ether passed through the sieve was then dispersed in methanol to measure the particle diameter using the laser diffraction particle size analyzer SALD-2000 (manufactured by Shimadzu Corporation). When the amount of the polyphenylene ether remaining on the sieve exceeded 50% of the total amount of the polyphenylene ether sifted through the sieve, the particle diameter was determined as >1,000 hum.

8) Processability (MFR)

This was measured at 220° C. under a load of 10 kg in accordance with JIS K7210.

9) Heat Resistance (Deflection Temperature Under Load)

This was measured under a load of 18.6 kg using a test piece of ¼ inch in accordance with ASTM-D-648.

10) Adhesion to Epoxy Resin

A mixture of 84.5% of AER 250 and 15.5% of hardner (A) was cast into a mold 50×90 mm. A thermoplastic resin molded sheet of 50×90 mm was placed on the mixture in the mold. This was cured in a hot press under a condition of 80° C./0 kgf/cm²/2 minutes, 80° C./10 kgf/cm²/2 minutes and 80° C./40 kgf/cm²/20 minutes to prepare a test piece for determining adhesion. The resulting test piece was subjected to moisture absorption for 48 hours under a condition of 50° C. and a relative humidity of 95% Rh. The presence or absence of exfoliation after the test was determined.

11) Presence or Absence of Whitening

A strip specimen of 128 mm in length×12.8 mm in width×0.8 mm in thickness with a cross section of the gate portion of 2 mm×0.8 mm was injection molded at an injection pressure of 120 kgf/cm² and at an cylinder temperature of 290° C. for Example 19 and Comparative Example 16 or 260° C. for Example 20 and Comparative Example 17. Visual observations were made to determine whether any whitening occurred in the vicinity of the gate portion.

The following components were used in Examples and Comparative Examples:

Epoxy Resins:

AER 250 (manufactured by Asahi Kasei Epoxy Co., Ltd.); epoxy equivalent 184–186;

Polyphenylene Ethers:

(PPE-1): poly-2,6-dimethyl-1,4-phenylene ether with a number average molecular weight in terms of polystyrene as determined by GPC of 2,300 and an average particle diameter of 38 μμm;

(PPE-2): poly-2,6-dimethyl-1,4-phenylene ether with a number average molecular weight in terms of polystyrene as determined by GPC of 3,100 and an average particle diameter of 43 μμm;

(PPE-3): This was obtained by thoroughly mixing 150 g of PPE-1, 37.5 g of AER 250 and 4.5 g of tri-n-butylamine (the reagent manufactured by Wako Pure Chemical Industries, Ltd.), hermetically sealing the mixture in an autoclave, and heating the mixture in the autoclave at 130° C. for one hour;

(PPE-4): poly-2,6-dimethyl-1,4-phenylene ether with an Isp/c of 0.43 as measured in chloroform solution at 30° C. and a weight average molecular weight/a number average molecular weight of 2.8;

Phosphazenes:

FR-1: A cyclic phenoxyphosphazene comprising 92.6% of a cyclic phenoxyphosphazene trimer, 5.0% of a cyclic phenoxyphosphazene tetramer and 2.4% of other phosphazene compounds;

Other Flame-retardants:

FR (A): A condensed phosphoric acid ester synthesized from bisphenol A and phenol as raw materials, which comprises 85.3% of a compound of n=1 and 12.6% of a compound of n=2 in the general formula as described below;

FR (B): CR 733S (manufactured by Daihachi Chemical Industry Co., Ltd.);

Hardners:

Hardner (A): m-xylene-α, α'-diamine (manufactured by Wako Pure Chemical Industries, Ltd.);

Rubber-reinforced Polystyrene (HIPS):

A rubber-reinforced polystyrene with a rubber content of 9% by weight, an ηsp/c of matrix polystyrene as measured in toluene at 30° C. of 0.64 and a volume average rubber particle diameter of 1.5 μm;

Polycarbonates (PC):

Panlite L-1250Y (manufactured by Teijin Chemicals Ltd.), non-flame retardant transparent grade;

Hydrogenated Block Copolymers (HTR):

A hydrogenated product of a styrene-butadiene-styrene block copolymer with a number average molecular weight of 60,000 having two styrene polymer blocks with a number average molecular weight of 15,000;

Polyamides (PA):

Leona 1300 (manufactured by Asahi Kasei Corporation); and

Polybutylene Terephthalate (PBT):

Teijin PBT C7000 (manufactured by Teijin Limited), non-flame retardant grade.

Examples 1–4

AER 250, PPE-1 and FR-1 each in an amount as shown in Table 1 were mixed with methyl ethyl ketone, and were uniformly dissolved therein by stirring the mixtures for 30 minutes in an oil bath heated to 130° C. The mixtures were further heated in the oil bath of 130° C. for 2 hours to remove methyl ethyl ketone. Then, the resulting mixtures were vacuum dried at 1 mm Hg or less for 2 hours in a vacuum dryer set at a temperature of 140° C. to completely remove methyl ethyl ketone. The resulting mixtures were maintained at 110° C., to which the hardner (A) was added.

The mixtures with the hardner (A) were heated for 60 seconds while being stirred and then cast into a mold.

The mixtures in the mold were then cured in a hot press at 100° C., 0 kgf/cm$^2$ for 2 minutes, 100° C./10 kgf/cm$^2$ for 2 minutes and 100° C./40 kgf/cm$^2$ for 10 minutes. The cured mixtures were removed from the mold and were finally post-cured at 120° C. for 2 hours to obtain molded test pieces. The molded test pieces were subjected to the flammability test. The results are shown in Table 1.

TABLE 1

|  | Ex. 1 | Ex. 2 | Ex. 3 | Ex. 4 |
| --- | --- | --- | --- | --- |
| AER250/% | 55.4 | 50.1 | 49.7 | 52.1 |
| PPE-1/% | 18.5 | 16.7 | 33.1 | 22.3 |
| Hardner (A)/% | 10.1 | 9.2 | 9.2 | 9.6 |
| FR-1/% | 16 | 24 | 8 | 16 |
|  | V0 | V0 | V0 | V0 |
| Average burning time/second | 3.0 | 3.4 | 4.3 | 2.8 |
| Dielectric constant | 3.10 | 3.11 | 3.04 | 3.09 |

Comparative Example 1

AER 250 in an amount of 84.5% was maintained at 110° C., to which the hardner (A) was added in an amount of 15.5% by weight. The resulting mixture was heated for 90 seconds while being stirred and the cast into a mold.

The mixture in the mold was then cured in a hot press at 100° C., 0 kgf/cm$^2$ for 2 minutes, 100° C./10 kgf/cm$^2$ for 2 minutes and 100° C./40 kgf/cm$^2$ for 10 minutes. The cured mixture removed from the mold and was finally post-cured at 120° C. for 2 hours to obtain a molded test piece. The molded test piece was subjected to the flammability test. The molded test piece was rated as substandard. The result is shown in Table 2.

Molded test pieces were prepared according to a method similar to Example 1 except that the components and amount thereof were changed as shown in Table 2. The results are shown in Table 2.

Comparative Examples 2–5

TABLE 2

|  | Comp. Ex. 1 | Comp. Ex. 2 | Comp. Ex. 3 | Comp. Ex. 4 | Comp. Ex. 5 |
| --- | --- | --- | --- | --- | --- |
| AER250/% | 84.5 | 65.9 | 64.2 | 50.1 | 50.1 |
| PPE-1/% | 0 | 22.0 | 0 | 16.7 | 16.7 |
| Hardner (A)/% | 15.5 | 12.1 | 11.8 | 9.2 | 9.2 |
| FR-1/% | 0 | 0 | 24 | — | — |
| FR(A)/% | — | — | — | 24 | — |
| FR(B)/% | — | — | — | — | 24 |
| Phosphorus content/% | 0 | 0 | 3.2 | 2.1 | 2.6 |
|  | below standard | below standard | below standard | below standard | below standard |
| Average burning time/second | 126.3 | 107.2 | 21.1 | 11.0 | 52.9 |
| Dielectric constant | 3.29 | 3.03 | 3.11 | 3.17 | 3.24 |

Examples 5–8

AER 250, PPE-2 and FR-1 each in an amount as shown in Table 3 were mixed with methyl ethyl ketone, and were uniformly dissolved therein by stirring the mixture for 30 minutes in an oil bath heated to 130° C. The mixtures were further heated in the oil bath of 130° C. for 2 hours to remove methyl ethyl ketone. Then, the resulting mixtures were vacuum dried at 1 mm Hg or less for 2 hours in a vacuum dryer set at a temperature of 140° C. to completely remove methyl ethyl ketone. The resulting mixtures were maintained at 110° C., to which the hardner (A) was added. The mixtures with the hardner (A) were heated for 60 seconds while being stirred and then cast into a mold.

The mixtures in the mold were then cured in a hot press at 150° C., 0 kgf/cm$^2$ for 1 minute, 150° C./10 kgf/cm$^2$ for 2 minutes and 150° C./40 kgf/cm$^2$ for 10 minutes. The cured mixtures were removed from the mold and were post-cured at 120° C. for 2 hours to obtain molded test pieces. The molded test pieces were subjected to the flammability test. The results are shown in Table 3.

TABLE 3

|  | Ex. 5 | Ex. 6 | Ex. 7 | Ex. 8 |
| --- | --- | --- | --- | --- |
| AER250/% | 55.4 | 50.1 | 49.7 | 52.1 |
| PPE-2/%. | 18.5 | 16.7 | 33.1 | 22.3 |
| Hardner (A)/% | 10.1 | 9.2 | 9.2 | 9.6 |
| FR-1/% | 16 | 24 | 8 | 16 |
|  | V0 | V0 | V0 | V0 |
| Average burning time/second | 3.0 | 3.3 | 4.1 | 2.8 |
| Dielectric constant | 3.10 | 3.11 | 3.04 | 3.09 |

Examples 9 and 10, Comparative Example 6

Molded test pieces were prepared according to a method similar to Example 1 except that the components and amount thereof were changed as shown in Table 4. The molded test pieces were subjected to the flammability test. The results are shown in Table 4.

TABLE 4

|  | Ex. 9 | Ex. 10 | Comp. Ex. 1 | Comp. Ex. |
|---|---|---|---|---|
| AER250/% | 44.1 | 48.5 | 84.5 | 63.9 |
| PPE-3/% | 28.5 | 31.1 | 0 | 24.4 |
| Hardner (A)/% | 11.4 | 12.4 | 18.5 | 11.7 |
| FR-1/% | 16 | 8 | 0 | 0 |
|  | V0 | V0 | below standard | below standard |
| Average burning time/second | 1.0 | 4.8 | 126.3 | 87.3 |
| Dielectric constant | 3.08 | 3.05 | 3.29 | 3.04 |

Example 11

PPE-1 in an amount of 18.5% and FR-1 in an amount of 16.0% were mixed with methyl ethyl ketone, and were uniformly dissolved therein in an oil bath heated to 130° C. The mixture was further heated in the oil bath of 130° C. for 2 hours to remove methyl ethyl ketone. Then, the resulting mixture was vacuum dried at 1 mm Hg or less for 2 hours in a vacuum dryer set at a temperature of 140° C. to completely remove methyl ethyl ketone, obtaining a flame-retardant composition.

The resulting flame-retardant composition and AER 250 in an amount of 55.4% were dissolved in methyl ethyl ketone, and then methyl ethyl ketone was completely removed in a similar manner. The resulting mixture was maintained at 110° C. and added with the hardner (A) in an amount of 10.1%. The mixture with the hardner (A) was heated for 60 seconds while being stirred and then cast into a mold.

The mixture in the mold was then cured in a hot press at 100° C., 0 kgf/cm² for 2 minutes, 100° C./10 kgf/cm² for 2 minutes and 100° C./40 kgf/cm² for 10 minutes. The cured mixture was removed from the mold and was finally post-cured at 120° C. for 2 hours to obtain a molded test piece. The resulting molded test piece was subjected to the flammability test. The test piece had an average burning time of 3.3 seconds and a flame rating of V-0.

Example 12

FR-1 in an amount of 24% and PPE-1 in an amount of 16.7% were used to prepare a flame-retardant composition in a manner similar to Example 11. Further, AER 250 in an amount of 50.1% and the hardner (A) in an amount of 9.2% were used to prepare a molded test piece in a manner similar to Example 11. The test piece was subjected to flammability test, and it had an average burning time of 3.5 seconds and a flame rating of V-0.

Example 13

PPE synthesized according to a method described in U.S. Pat. No. 6,211,327 was used. This polyphenylene ether comprises particles with a diameter of 1,000 μm each or more in an amount of 97%, and has an average particle diameter of 1,000 μm or more, and an average molecular weight of about 3,000 in terms of polystyrene.

AER 250 (Epoxy equivalent 185) in an amount of 55.4%, PPE in an amount of 18.5%, FR-1 in an amount of 16.0%, and methyl ethyl ketone, were all mixed and the mixture was stirred for 30 minutes in an oil bath heated to 130° C. The mixture did not completely dissolve, but exhibited extremely poor solubility compared with the polyphenylene ether with the small average particle diameter. The mixture was further stirred for 2 hours while appropriately adding methyl ethyl ketone, thereby dissolving the mixture. The mixture was further heated in the oil bath at a temperature of 130° C. for 2 hours to remove methyl ethyl ketone. Then, the resulting mixture was vacuum dried at 1 mm Hg or less for 2 hours in a vacuum dryer set at a temperature of 140° C. to completely remove methyl ethyl ketone. The resulting mixture was maintained at 110° C., to which 10.1% of the hardner (A) was added. The mixture with the hardner (A) was heated for 60 seconds while being stirred and then cast into a mold.

The mixture in the mold was then cured in a hot press at 150° C, 0 kgf/cm² for 1 minute, 150° C./10 kgf/cm² for 2 minutes and 150° C./40 kgf/cm² for 10 minutes. The cured mixture was removed from the mold to obtain a test piece. The resulting molded test piece was subjected to the flammability test. The flame rating was V-0.

Comparative Example 7

AER 250 in an amount of 61.6%, PPE4 in an amount of 20.6%, and FR-1 in an amount of 17.8% were mixed with methyl ethyl ketone, and the mixture was stirred in an oil bath heated to 130° C. PPE-4 did not dissolve in methyl ethyl ketone.

Comparative Example 8

AER 250 in an amount of 73.7%, PPE4 in an amount of 8.2%, and FR-1 in an amount of 18.1% were mixed with methyl ethyl ketone, and the mixture was stirred in an oil bath heated to 130° C. PPE-4 did not dissolve in methyl ethyl ketone.

Comparative Example 9

AER 250 in an amount of 73.7%, PPE-4 in an amount of 8.2%, and FR-1 in an amount of 18.1% were heated in an oil bath heated to 200° C. for 6 hours. A cured test piece could not be prepared because PPE-4 did not completely dissolve and the mixture was in a very viscous liquid state.

Comparative Example 10

AER 250 in an amount of 73.7%, PPE-4 in an amount of 8.2%, FR-1 in an amount of 18.1%, and toluene were mixed, and the mixture was dissolved while removing toluene in an oil bath heated to 160° C. Then, the resulting mixture was vacuum dried at 1 mmHg or less for 4 hours in a vacuum dryer set at a temperature of 180° C. to completely remove toluene. A cured test piece could not be prepared, as the resulting mixture was in a very viscous liquid state even at 180° C.

Polyphenylene ethers with different molecular weights to be used in Examples 14 and 15 and Comparative Examples 11 and 12 were synthesized according the method described below.

(Synthesis of Polyphenylene Ethers)

A 15 liter jacketed reaction vessel equipped with an oxygen-containing gas-introducing pipe, a stirring blade and a gas discharge pipe was charged with 2.512 g of cupric chloride dihydrate, 11.062 g of 35% hydrochloric acid, 36.179 g of di-n-butylamine, 95.937 g of N,N,N',N'-tetramethylpropanediamine, 1.8 kg-of 2,6-dimethylphenol, and 7 kg of a mixed solvent, with the composition by weight as shown in Table 1. The mixture was allowed to react while controlling the temperature at a specified level and supplying oxygen at a rate of 180 ml/min. At a specified time after introducing the oxygen, the introduction was stopped to complete the reaction. The resulting mixture containing a polymer slurry was heated to 50° C. Then, a 10% aqueous solution of tripotassium ethylenediaminetetraacetate was added as well as hydroquinone in portions. The resulting mixture was left standing at 50° C. until the slurry turned white. After the completion of the reaction, the slurry obtained by filtration was washed with methanol and then dried with a vacuum drier of 100° C. to obtain a polyphenylene ether polymer powder. The molecular weight of the obtained powder was determined by GPC.

The composition of the mixed solvent used for the polymerization, the polymerization temperature, and the average molecular weight of the obtained polyphenylene ether are collectively shown in Table 5.

TABLE 5

|  |  | PPE-5 | PPE-6 | PPE-7 |
|---|---|---|---|---|
| Solvent Composition/% | Methanol | 90 | 20 | 20 |
|  | Butanol | 10 | 20 | 20 |
|  | Xylene | 0 | 60 | 60 |
| Polymerization temperature/° C. |  | 40 | 40 | 40 |
| Polymerization time/min |  | 120 | 60 | 120 |
| Number average molecular weight in terms of polystyrene |  | 1300 | 3800 | 11200 |

Example 14

A varnish was prepared from 500 g of "EPICLON 1050" manufactured by Dainippon Ink & Chemicals, Inc. as a raw material for an epoxy resin, 11.05 g of dicyandiamide, 5.1 g of 10% DMF solution of "2E4MZ" manufactured by Shikoku Corp. as a hardening accelerator, 110 g of DMF and 110 g of methyl ethyl ketone. The varnish was mixed with a flame-retardant composition prepared by dissolving 250 g of a low molecular weight PPE (PPE-5) and 250 g of FR-i in 400 g of methyl ethyl ketone. The varnish containing the flame-retardant was used to prepare an 8-layered laminate. B-stage drying was performed at 160° C. for 10 minutes. A press was started from 130° C. and completed by the pressurization of 30 kgf/cm² at 170° C. for 60 minutes.

The obtained test piece was subjected to the vertical flammability test according to UL 94 specification, and it had an average burning time of 8.6 seconds.

Example 15

When a similar test was conducted by using PPE-6 as PPE, an average burning time of 6.7 seconds was obtained.

Comparative Example 11

When a similar test was conducted without adding the flame-retardant composition, the test piece burned out without being extinguished with the first flame application in the flammability test.

Comparative Example 12

An attempt to use PPE-7 as PPE for the similar test was tried, but PPE-7 did not dissolve in methyl ethyl ketone and the test could not be conducted.

Examples 16–20, Comparative Examples 13–17

The components were mixed at the ratio as shown in Tables 5 and 6, and the mixture was fed to a twin-screw extruder of 25 mm in screw diameter at the temperature of 300° C., the maximum temperature of the heating cylinder, and melt-blended at a screw revolution speed of 300 rpm, followed by the cooling and the cutting of the strands to obtain pellets of the resin composition. Then, the resulting pellets of the resin composition were injection molded at a cylinder-setting temperature of 240–300° C. to prepare test pieces, which were subjected to physical property tests according to the above-mentioned test methods to obtain the results shown in Tables 6 and 7. In addition, all test pieces which were subjected to a flammability test had a flame rating of V-0.

TABLE 6

|  | Ex. 16 | Comp. Ex. 13 | Ex. 17 | Comp. Ex. 14 | Ex. 18 | Comp. Ex. 15 |
|---|---|---|---|---|---|---|
| PPE-2/% | 27 | — | 27 | — | 27 | — |
| PPE-4/% | — | 27 | — | 27 | — | 27 |
| FR-1/% | 18 | 18 | 18 | 18 | 18 | 18 |
| HIPS/% | 55 | 55 | — | — | — | — |
| PC/% | — | — | 55 | 55 | — | — |
| HTR/% | — | — | — | — | 55 | 55 |
| Epoxy adhesion | ○ | X | ○ | X | ○ | X |

TABLE 7

|  | Ex. 19 | Comp. Ex. 16 | Ex. 20 | Comp. Ex. 17 |
|---|---|---|---|---|
| PPE-2/% | 31 | — | 32 | 0 |
| PPE-4/% | 23 | 46 | 16 | 48 |
| FR-1/% | 15 | 23 | 20 | 20 |
| PA/% | 31 | 31 | — | — |
| PBT/% | — | — | 32 | 32 |
| Whitening | 0/50 | 4/50 | 0/50 | 5/50 |

Example 21

A molded test piece of 50 mm in length×50 mm in width×2 mm in thickness was prepared using the same composition and method as in Example 1, and it was subjected to the measurement of drill resistance. The result is shown in Table 8. Further, the electron microscope observation was conducted to observe the diameter of dispersed particles. The observation from the X-direction, Y-direction and Z-direction showed that the particles when viewed from any direction, had a virtually circular cross section. Thus, it has been shown that the particles were dispersed as a particle with a nearly spherical shape. In addition, when the particle was scanned for phosphorus element, it was found that that phosphorus element was uniformly dispersed.

Example 22

A molded test piece of 50 mm in length×50 mm in width×2 mm in thickness was prepared using the same composition and method as in Example 5, and was subjected to the measurement of drill resistance. The result is shown in Table 8. Further, the electron microscope observation from the X-direction, Y-direction and Z-direction showed that the particles when viewed from any direction, had a virtually circular cross section. Thus, it was shown that the particles were dispersed as a particle with a nearly spherical shape.

Example 23

A molded test piece of 50 mm in length×50 mm in width×2 mm in thickness was prepared using the same composition and method as in Example 9, and was subjected to the measurement of drill resistance. The result is shown in Table 8. Further, the electron microscope observation from the X-direction, Y-direction and Z-direction showed a uniform surface when viewed from any direction, because the polyphenylene ether was dissolved in the epoxy phase.

Example 24

AER 250 in an amount of 55.4% was dissolved with FR-1 in an amount of 16% at 130° C. The solution was mixed with 18.5% of PPE-2 at 130° C., and then mixed with 10.1% of the hardner (A) at 130° C. The resulting mixture was cast into a mold of 50 mm in length×50 mm in width×2 mm in thickness, cured at 140° C. for 2 hours, and then at 190° C. for 3 hours. The sample was cooled to room temperature and removed from the mold. In one part of the resulting test piece, the polyphenylene ether was visually recognizable. The molded test piece was used to measure drill resistance. At the same time, a molded test piece for flammability test was prepared and was subjected to the flammability test. The molded test piece exhibited cotton ignition. The results are shown in Table 8.

Further, the electron microscope observation from the X-direction, Y-direction and Z-direction showed that the polyphenylene ether resin had various particle sizes and shapes, and had an average particle size of 50 μm or more.

TABLE 8

|  |  | Ex. 21 | Ex. 22 | Ex. 23 | Ex. 24 |
|---|---|---|---|---|---|
| AER250/% |  | 55.4 | 55.4 | 44.1 | 55.4 |
| PPE/% | PPE-1 | 18.5 | — | — | — |
|  | PPE-2 | — | 18.5 | — | 18.5 |
|  | PPE-3 | — | — | 28.5 | — |
| Hardner (A)/% |  | 10.1 | 10.1 | 11.4 | 10.1 |
| FR-1/% |  | 16 | 16 | 16 | 16 |
| PPE particle diameter/μm |  | 1.6 | 1.5 | dissolved | >50 |
| Drill resistance |  | ○ | ○ | ○ | X |
| Appearance of molded piece |  | ○ | ○ | ○ | X |
|  |  | V0 | V0 | V0 | V2 |
| Average burning time/second |  | 3.0 | 3.0 | 1.0 | 4.5 |
| Cotton ignition |  | no | no | no | yes |

A flame-retardant comprising low molecular weight polyphenylene ether and a phosphorus compound can impart adequate flame retardancy to thermoplastic resins, cross-linkable resins and the like, is excellent in processability, and can provide a good flame-retardant resin composition which maintains heat resistance.

Although the present invention has been described in detail and with reference to specific embodiments, it is apparent to those skilled in the art that various changes and modifications may be made without departing from the spirit and scope of the present invention.

The invention claimed is:

1. A flame-retardant composition comprising from 20 to 95% by weight of (a) a polyphenylene ether resin having a number average molecular weight of 500 to 5,000, and from 80 to 5% by weight of (b) a phosphazene compound wherein said phosphazene compound comprises a total of 95% by weight or more of a cyclic phosphazene compound represented by formula (1) and/or a straight chain phosphazene compound represented by formula (2):

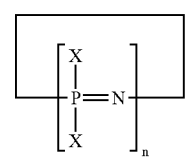

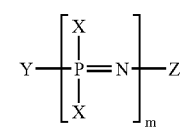

where n represents an integer of 3 to 15; m represents an integer 3 to 1,000; X represents an aryloxy group represented by formula (3):

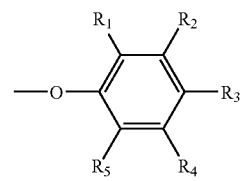

(where R1, R2, R3, R4 and R5 each independently represent hydrogen atom, an alkyl or alkoxy group having 1–5 carbon atoms or a phenyl group), a naphthyloxy group, or an alkyloxy group having 1–6 carbon atoms; Y represents —N=P(O)(X) or —N=P(X)$_3$; and Z represents —P(X)$_4$ or —P(O)(X)$_2$ wherein said phosphazene compound comprises 80% by weight or more of a cyclic phosphazene trimer and/or tetramer.

2. The flame-retardant composition according to claim 1, wherein said polyphenylene ether resin has a number average molecular weight of 1,200 to 4,000.

3. The flame-retardant resin composition according to claim 1, wherein a part or all of said polyphenylene ether resin is functionalized with a compound having at least one functional group selected from the group consisting of an epoxy group, an amino group, a hydroxy group, a mercapto group, a carboxyl group and a silyl group.

4. The flame-retardant composition according to claim 1, wherein 90 mol % or more of the all occurrences of substituent X is a phenoxy group in said phosphazene compound.

5. The flame-retardant composition according to claim 1, wherein said polyphenylene ether resin has an average particle diameter of 5 μm to 500 μm.

6. A flame-retardant resin composition comprising a resin and a flame-retardant composition comprising from 20 to 95% by weight of (a) a polyphenylene ether resin having a number average molecular weight of 500 to 5,000, and from 80 to 5% by weight of (b) a phosphazene compound.

7. The flame-retardant resin composition according to claim 6, wherein said resin is at least one thermosetting resin selected from the group consisting of unsaturated polyester resins, vinylester resins, diallylphthalate resins, epoxy resins, cyanate resins, xylene resins, triazine resins, phenol resins, urea resins, melamine resins, benzoguanamine resins, urethane resins, ketone resins, alkyd resins, furan resins, styryl pyridine resins, silicone resins and synthetic rubbers.

8. The flame-retardant resin composition according to claim 6, wherein said resin comprises an epoxy resin.

9. The flame-retardant resin composition according to claim 6, wherein the concentration of phosphorus atoms is from 0.5% to 8.0% by weight.

10. The flame-retardant resin composition according to claim 6, wherein said polyphenylene ether resin is dispersed as particles with an average diameter of 10 µm or less.

11. The flame-retardant resin composition according to claim 6, characterized in that said resin is a thermoplastic resin.

12. The flame-retardant resin composition according to claim 6, wherein said resin is at least one thermoplastic resin selected from the group consisting of polycarbonates, polyphenylene ethers, polyphenylene sulfides, polypropylene, polyethylene, polystyrene, ABS resins, polyalkylene terephthalates, polyamides, thermotropic liquid crystal polymers and elastomer-containing polystyrenes.

13. The flame-retardant resin composition according to claim 6, wherein said resin is at least one thermoplastic resin selected from the group consisting of polyphenylene ether/polypropylene, polyphenylene ether/polystyrene, polyphenylene ether/polyamide, polyphenylene ether/thermotropic liquid crystal polymer, polyphenylene ether/polyphenylene sulfide and polyphenylene ether/polyalkylene terephthalate.

14. The flame-retardant resin composition according to claim 6, wherein the sum of the content of component (a) and a double amount of the content of component (b) in the flame-retardant resin composition is 15% by weight or more.

15. The flame-retardant resin composition according to claim 6, wherein the sum of the content of component (a) and a double amount of the content of component (b) in the flame-retardant resin composition is 25% by weight or more.

16. The flame-retardant resin composition according to claim 6, wherein the sum of the content of component (a) and a double amount of the content of component (b) in the flame-retardant resin composition is 40% by weight or more.

* * * * *

UNITED STATES PATENT AND TRADEMARK OFFICE
CERTIFICATE OF CORRECTION

| | |
|---|---|
| PATENT NO. | : 7,091,266 B2 |
| APPLICATION NO. | : 10/515377 |
| DATED | : August 15, 2006 |
| INVENTOR(S) | : Fumiki Murakami et al. |

It is certified that error appears in the above-identified patent and that said Letters Patent is hereby corrected as shown below:

Title Page, item [54] Column 1 (Title), Line 1, change "FLAME RETARDANT" to --FLAME-RETARDANT--.

Column 1, Line 1, change "FLAME RETARDANT" to --FLAME-RETARDANT--.

Column 22, Line 22, after "integer" insert --of--.

Signed and Sealed this

Twenty-sixth Day of December, 2006

JON W. DUDAS
*Director of the United States Patent and Trademark Office*